US009789965B2

(12) United States Patent
Benthien et al.

(10) Patent No.: US 9,789,965 B2
(45) Date of Patent: Oct. 17, 2017

(54) SEAT ADJUSTMENT DEVICE AND AIRCRAFT OR SPACECRAFT

(75) Inventors: Hermann Benthien, Sottrum (DE); Susanne Schwarzer, Sottrum (DE); Stefan Welti, Flintbek (DE); Michael Dieckhoff, Sottrum (DE); Ali Güngör, Bremen (DE)

(73) Assignee: Airbus Operations GmbH, Hamburg (DE)

(*) Notice: Subject to any disclaimer, the term of this patent is extended or adjusted under 35 U.S.C. 154(b) by 265 days.

(21) Appl. No.: 13/316,002

(22) Filed: Dec. 9, 2011

(65) Prior Publication Data

US 2012/0145867 A1    Jun. 14, 2012

Related U.S. Application Data

(60) Provisional application No. 61/459,241, filed on Dec. 9, 2010.

(30) Foreign Application Priority Data

Dec. 9, 2010    (DE) .................... 10 2010 053 892

(51) Int. Cl.
*A47C 1/00*    (2006.01)
*B64C 1/20*    (2006.01)
(Continued)

(52) U.S. Cl.
CPC .......... *B64D 11/0696* (2013.01); *B64C 1/20* (2013.01); *B60N 2/01558* (2013.01); *B60N 2/01575* (2013.01); *B60N 2/0224* (2013.01); *B60N 2/0232* (2013.01); *B60N 2/067* (2013.01); *B60N 2/164* (2013.01); *B60N 2/1871* (2013.01);
(Continued)

(58) Field of Classification Search
CPC ........ B64D 11/06; B64D 25/04; B64D 25/10; B64D 11/0696; B64D 9/00; B64D 9/003; B64D 11/00; B64D 11/06395; B60N 2/166; B60N 2/1871; B60N 2/2231; B60N 2/067; B60N 2/0232; B60N 2/0224;
(Continued)

(56) References Cited

U.S. PATENT DOCUMENTS 3,184,209 A * 5/1965 Colautti ................... 248/429
4,114,947 A * 9/1978 Nelson .............. B60N 2/01558
                                                    248/503.1
(Continued)

FOREIGN PATENT DOCUMENTS

DE    19617877 C1    6/1997
DE    19603945 C2    12/1997
(Continued)

OTHER PUBLICATIONS

German Office Action for German Application No. DE 10 2010 053 892.2 dated Oct. 28, 2011.

*Primary Examiner* — Leslie A Nicholson, III
*Assistant Examiner* — Taylor Morris
(74) *Attorney, Agent, or Firm* — Jenkins, Wilson, Taylor & Hunt, P.A.

(57) ABSTRACT

The present invention provides a seat adjustment device for an aircraft or spacecraft, comprising:
a seat rail for connection to a floor; and
a seat connection for connection to at least one seat;
and a worm is provided which can be actuated to adjust the seat connection relative to the seat rail.

16 Claims, 16 Drawing Sheets

(51) Int. Cl.
| | |
|---|---|
| *B64D 11/06* | (2006.01) |
| *B60N 2/42* | (2006.01) |
| *B60R 21/00* | (2006.01) |
| *A47C 7/62* | (2006.01) |
| *A47C 31/00* | (2006.01) |
| *F16M 13/00* | (2006.01) |
| *A47B 97/00* | (2006.01) |
| *B64C 1/22* | (2006.01) |
| *B64D 47/00* | (2006.01) |
| *B64C 1/06* | (2006.01) |
| *B60N 2/06* | (2006.01) |
| *B64D 9/00* | (2006.01) |
| *B60N 2/18* | (2006.01) |
| *B60N 2/015* | (2006.01) |
| *B60N 2/02* | (2006.01) |
| *B64D 11/00* | (2006.01) |
| *B60N 2/44* | (2006.01) |
| *B60N 2/16* | (2006.01) |

(52) U.S. Cl.
CPC .............. *B60N 2/443* (2013.01); *B64D 9/00* (2013.01); *B64D 9/003* (2013.01); *B64D 11/00* (2013.01); *B64D 11/06395* (2014.12)

(58) Field of Classification Search
CPC .... B60N 2/164; B60N 2/443; B60N 2/01558; B60N 2/01575; B64C 1/20; B60P 7/0815
USPC .... 248/424, 429, 419, 422, 423, 425, 503.1; 296/65.13, 65.17, 65.14, 68.1, 65.09; 297/344.1, 344.13, 344.14, 344.11, 297/216.15, 217.3, 330, 344.17; 244/118.1, 118.5, 118.6, 131; 410/101, 410/104
See application file for complete search history.

(56) References Cited

U.S. PATENT DOCUMENTS

| | | | | | |
|---|---|---|---|---|---|
| 4,641,806 | A | * | 2/1987 | Pipon | B60N 2/0232 248/430 |
| 4,936,527 | A | * | 6/1990 | Gorges | B64D 11/0696 104/165 |
| 5,178,346 | A | * | 1/1993 | Beroth | B64D 9/003 244/118.1 |
| 5,224,755 | A | * | 7/1993 | Beroth | B60N 2/242 297/216.1 |
| 5,323,998 | A | * | 6/1994 | Aihara | B60N 2/067 248/188.9 |
| 5,349,878 | A | * | 9/1994 | White | B60N 2/067 248/429 |
| 5,810,315 | A | * | 9/1998 | Dinkel | B60N 2/072 248/424 |
| 6,352,312 | B1 | * | 3/2002 | Rees | B60N 2/071 248/429 |
| 6,499,712 | B1 | * | 12/2002 | Clark et al. | 248/429 |
| 6,554,225 | B1 | * | 4/2003 | Anast et al. | 244/117 R |
| 6,824,104 | B2 | * | 11/2004 | Smallhorn | 244/118.5 |
| 6,848,664 | B2 | * | 2/2005 | Ito | B60N 2/0232 248/429 |
| 7,036,889 | B2 | * | 5/2006 | Sanfrod et al. | 297/463.2 |
| 7,100,885 | B2 | * | 9/2006 | Zerner | 248/503.1 |
| 7,232,094 | B2 | * | 6/2007 | Bishop | B60N 2/01575 244/118.6 |
| 7,318,695 | B2 | * | 1/2008 | Yu | B61D 45/001 410/105 |
| 7,389,960 | B2 | * | 6/2008 | Mitchell | B60N 2/0224 244/118.5 |
| 7,823,967 | B2 | * | 11/2010 | Parnis et al. | 297/180.12 |
| 2006/0016944 | A1 | * | 1/2006 | Howard | B64D 11/0624 248/188.1 |
| 2008/0067289 | A1 | * | 3/2008 | Meyer | B64C 1/064 244/131 |
| 2009/0014584 | A1 | * | 1/2009 | Rudduck | B60N 2/071 244/118.6 |
| 2009/0130482 | A1 | * | 5/2009 | Kocik | B23K 15/0006 428/651 |
| 2009/0282655 | A1 | * | 11/2009 | James | 24/458 |
| 2010/0108808 | A1 | | 5/2010 | Allain et al. | |
| 2011/0062285 | A1 | * | 3/2011 | Herzog | B64D 11/00 244/118.6 |
| 2011/0253874 | A1 | * | 10/2011 | Marechal | B64D 11/0696 248/503.1 |
| 2011/0309195 | A1 | * | 12/2011 | Bishop | B64D 11/0696 244/118.6 |
| 2012/0217368 | A1 | * | 8/2012 | Zunino | B60N 2/01575 248/429 |
| 2014/0030039 | A1 | * | 1/2014 | Rollfink | B64D 11/0696 410/105 |

FOREIGN PATENT DOCUMENTS

| | | | |
|---|---|---|---|
| DE | 10062217 A1 | * | 7/2002 |
| DE | 10118031 C2 | | 10/2002 |
| DE | 10118031 C2 | * | 4/2003 |
| DE | 10360809 A1 | * | 7/2005 |
| WO | WO 2010/108793 A1 | | 9/2010 |

* cited by examiner

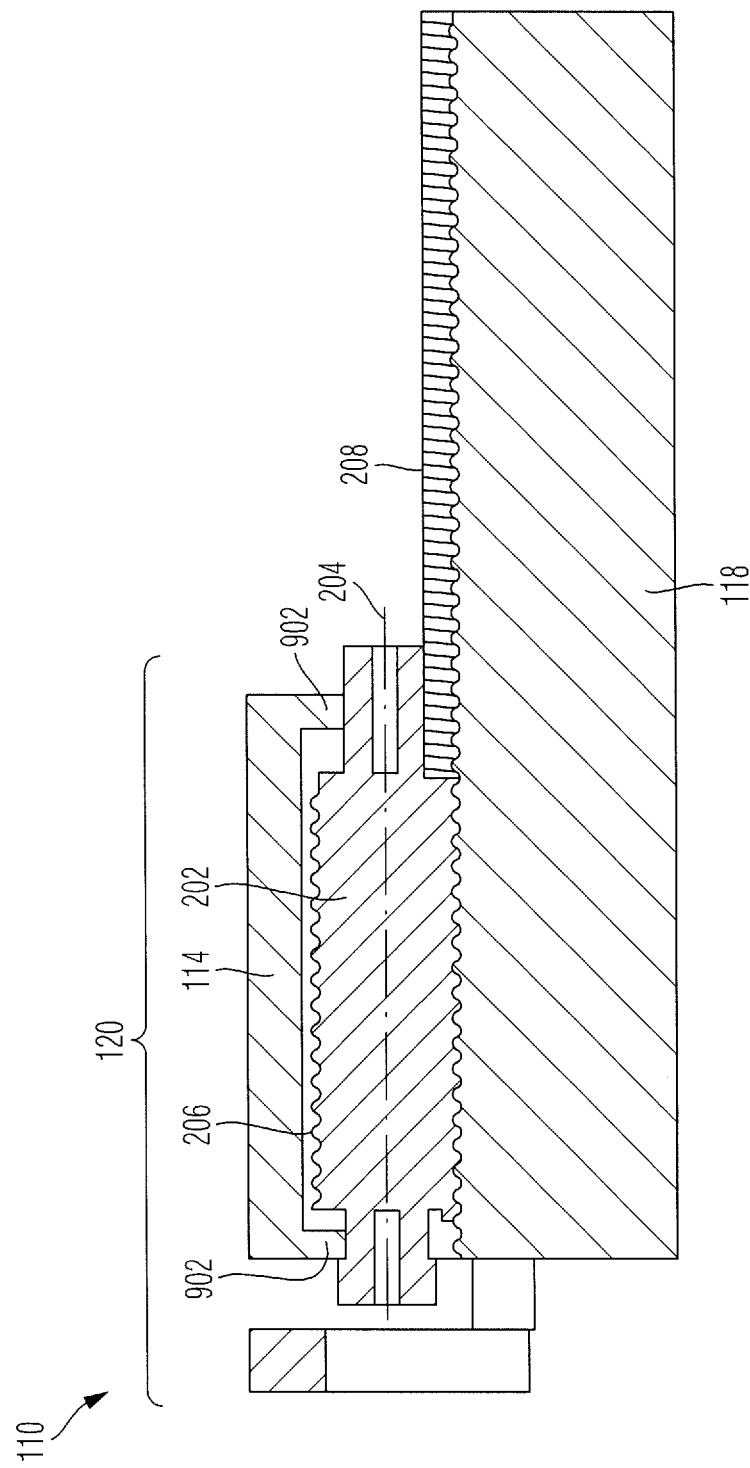
Fig. 2.1

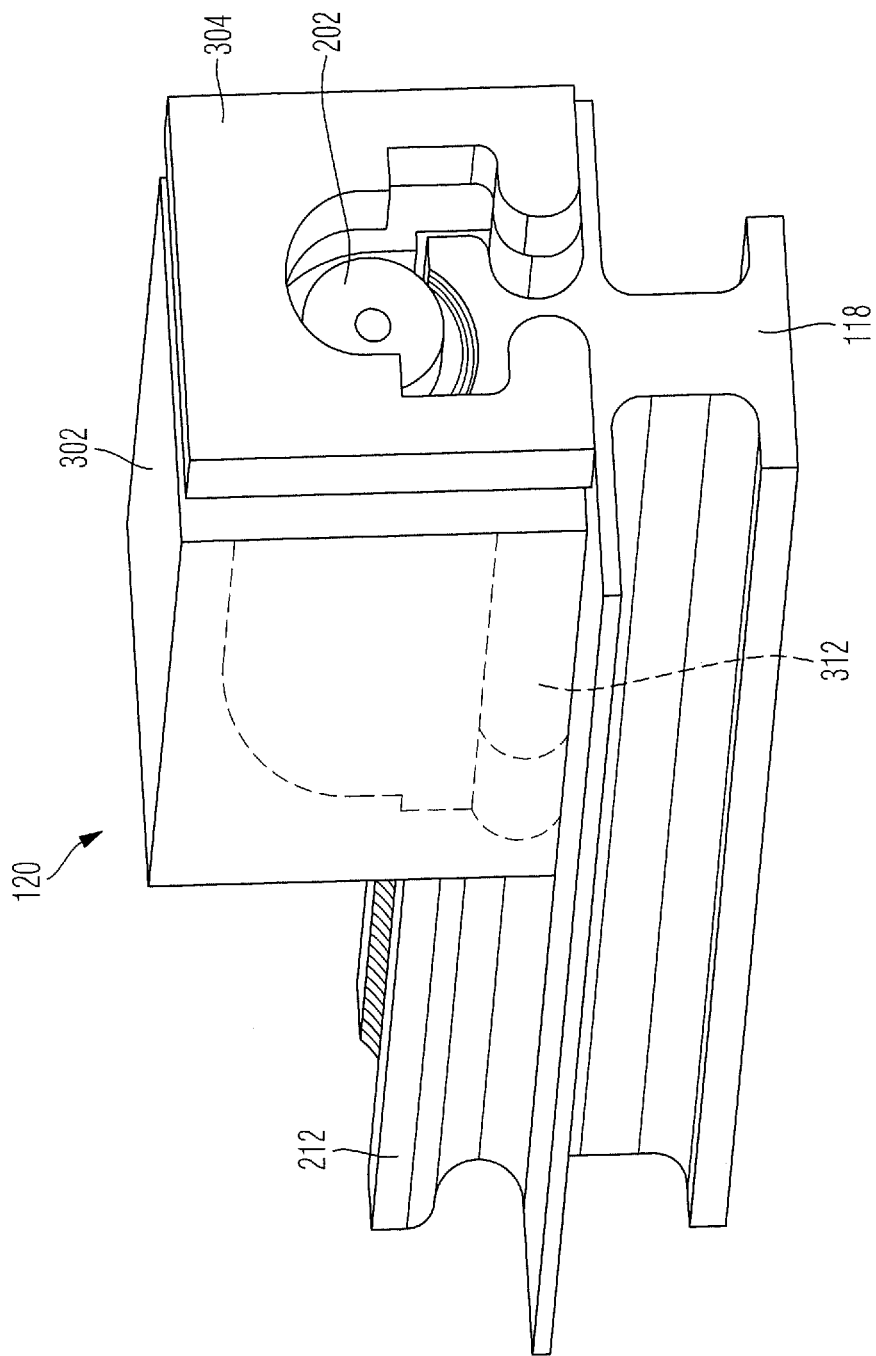
Fig. 4.1

Fig. 13 (E-E)

SEAT ADJUSTMENT DEVICE AND AIRCRAFT OR SPACECRAFT

CROSS-REFERENCE TO RELATED APPLICATIONS

This application claims the benefit of and priority to U.S. Provisional Application No. 61/459,241, filed Dec. 9, 2010, and German patent application 10 2010 053 892.2 filed Dec. 9, 2010, the entire disclosures of which are herein incorporated by reference.

FIELD OF THE INVENTION

The present invention relates to a seat adjustment device and to an aircraft or spacecraft.

Although the present invention and the problem on which it is based can be applied to any seat adjustment devices and to any aircraft or spacecraft, they will be described in detail with respect to an aircraft which has a reconfigurable cabin layout.

A reconfiguration of a cabin layout of an aircraft is desirable to allow an individual adaptation of the cabin layout to requests by individual passengers or to requirements imposed by aircraft operators. The reconfiguration comprises, for example, releasing a respective seat from associated seat rails, moving the seat, equating the new actual position of the seat with a desired position according to the new cabin layout, if necessary adapting the new actual position and attaching the seat in the new actual position. However, in the past, a reconfiguration of this type of a cabin layout was relatively laborious because to had to be carried out manually.

BACKGROUND. OF THE INVENTION

Seat adjustment devices comprising a seat rail and a seat connection are known. A conveyor chain or a motor may also be provided to adjust the seat connection relative to the seat rail. The position of a respective seat or of a respective row of seats may be adapted to a predeterminable cabin layout by means of this adjustment.

SUMMARY OF THE INVENTION

According to the invention, a seat adjustment device for an aircraft or spacecraft is provided, comprising a seat rail for connection to a floor and comprising a seat connection for connection to a seat, and a worm is provided which can be actuated to adjust the seat connection relative to the seat rail.

An aircraft or spacecraft is also provided which comprises the seat adjustment device according to the invention, a floor to which the seat rail of the seat adjustment device is connected and a seat to which the seat connection of the seat adjustment device is connected.

The idea on which the present invention is based is that a worm is provided which can be actuated to adjust the seat connection relative to the seat rail. In the present context, the term "worm" is understood as meaning a shaft which comprises one or more threads. A worm of this type has the advantage that it acts in a self-locking manner. This means that the worm prevents a relative movement between the seat connection and the seat rail when the worm is not actuated. Only when the worm is rotated about its axis of rotation by an appropriate drive means does the seat connection move relative to the seat rail. Thus, with the present solution, no additional securing means is required to prevent a relative movement between the seat connection and the seat rail. Furthermore, a worm or a corresponding worm drive has a high transmission ratio so that only a low driving torque is required to rotate the worm about its axis of rotation and to thus produce a relative movement between the seat connection and the seat rail. Thus, for example an electric servomotor for driving the worm about its axis of rotation can be configured to be relatively small and thus lightweight, which has a positive effect on the weight of the aircraft, for example. Furthermore, the worm has a relatively small extension in a direction transverse to its axis of rotation, so that its presence does not substantially reduce the useful fuselage diameter of a corresponding aircraft.

According to a preferred configuration of the seat adjustment device of the invention, the seat rail has teeth and the seat connection supports the worm in a rotatably mounted manner, the teeth meshing with the worm. The teeth extend in the longitudinal direction of the seat rail, an individual tooth of the teeth extending in the transverse direction of the seat rail. The axis of rotation of the worm also extends in the longitudinal direction of the seat rail.

According to a further preferred configuration, the seat rail is configured as a profile with a head portion which has the teeth. The head portion is stable enough to support the teeth due to its thickness. Configuring the seat rail as a profile simplifies the production thereof.

According to a further preferred configuration of the seat adjustment device of the invention, the seat rail has a base portion for connection with the floor and the base portion adjoins the head portion, said base portion preferably comprising aluminium and/or the head portion preferably comprising titanium. Due to the fact that the head portion supports the teeth which are exposed to relatively high loads due to their interaction with the worm, particularly under the influence of flight loads, it is favourable to produce the head portion from durable or heavy-duty titanium. The base portion which is subjected to lighter loads can then be produced from aluminium, which is cost effective. The base portion and the head portion are preferably welded together. Included here as welding methods are, in particular, friction stir welding, laser welding or electron beam welding. Of course, "aluminium" also includes aluminium alloys. Likewise, "titanium" also includes titanium alloys.

According to a further preferred configuration of the seat adjustment device of the invention, the teeth partly extend in the peripheral direction about an axis of rotation of the worm. Thus, an improved contact is achieved between the teeth and the worm than would be the case if the teeth merely extended transversely to the axis of rotation of the worm. In turn, the result of the improved contact is that higher loads can be transmitted between the worm and the teeth, and these components have a greater service life.

According to a further preferred configuration of the seat adjustment device of the invention, the seat connection engages over the seat rail, in particular the head portion thereof, in the transverse direction of the seat rail. Whereas the worm prevents a movement of the seat connection relative to the seat rail in the longitudinal direction of the seat rail, this development produces a positive locking between the seat connection and the seat rail transversely to the seat rail. Consequently, for example a seat or a row of seats in an aircraft or spacecraft can be connected to the floor in the vertical direction of said aircraft or spacecraft.

According to a further preferred configuration of the seat adjustment device of the invention, the seat connection comprises a seat adapter and an insertion adapter which can be brought into engagement with one another for engagement over the seat rail in the transverse direction of the seat rail. This two-part configuration of the seat connection makes it possible, described in the following by way of example with reference to an aircraft, to attach a seat including the seat connection with seat adapter from above onto the seat rail and then to engage the insertion adapter with the seat adapter for engagement over the seat rail. This measure avoids a laborious threading of the seats onto a respective seat rail.

According to a further preferred configuration of the seat adjustment device of the invention, the seat adapter engages around the head portion of the seat rail and is configured with a receiving element, the insertion adapter comprising an engagement element which can be engaged with the receiving element and the head portion. Due to its shape, the head portion is suitable for forming a positive locking with the seat connection in the transverse direction of the seat rail or in the vertical direction of a corresponding aircraft.

According to a further preferred configuration of the seat adjustment device of the invention, the engagement element is configured as a pin, the receiving element is configured as an approximately semicircular recess and the seat rail is configured with a corresponding approximately semicircular recess behind the head portion, the two semicircular recesses complementing one another to form an approximately fully circular recess into which the pin can be inserted in the longitudinal direction of the seat rail. In the present context, the phrase "approximately semicircular" is to be understood as meaning that when the pin has been inserted into the two approximately semicircular recesses, it engages in each of them and thus produces a positive locking between the seat rail and the seat adapter. In the present context, the phrase "approximately fully circular" is to be understood as meaning that the pin is held in the fully circular recess, without being able to slip out of the approximately fully circular recess in the transverse direction of the seat rail. This provides an easily producible, detachable, form-locking connection between the seat connection and the seat rail. More preferably, two pins with respectively corresponding receiving elements are provided.

According to a further preferred configuration of the seat adjustment device of the invention, the seat adapter has bearings which mount the worm at its opposing ends, and/or the pull-in adapter comprises a drive means, in particular an electric motor which actively engages with the worm for actuating said worm by means of an engagement of the insertion adapter with the seat adapter. Thus, two functions are preferably to be performed at the same time by means of an engagement of the insertion adapter with the seat adapter: on the one hand, the mentioned form locking is to be produced. On the other, the drive means is to be automatically coupled to the worm.

According to a further preferred configuration of the seat adjustment device of the invention, two sealing lips are provided which cover the seat rail, in particular the teeth thereof, with their free ends. As a result, the teeth are accommodated such that they are invisible to passengers of the aircraft, for example, and are also protected from dust, etc.

According to a further preferred configuration of the seat adjustment device of the invention, the seat connection is mounted such that it can slide and/or roll on the seat rail, the seat connection preferably comprising rolling bodies which are supported on the head portion of the seat rail. This ensures a simple displaceability of the seat connection relative to the seat rail. Thus, an appropriate drive means, in particular an electric motor for driving the worm can be configured to be correspondingly low-powered and thus lightweight.

According to a further preferred configuration of the aircraft or spacecraft of the invention, the floor has crossbars with in each case a flange, a base portion of the seat rail being at least partly arranged in an opening in a respective flange and being connected thereto. Connection methods include, in particular friction stir welding, laser welding or electron beam welding. Due to the fact that the base portion replaces part of the flange (corresponding to the width of the recess), the useful spatial height, for example in the fuselage of an aircraft can be increased.

According to a further preferred configuration of the aircraft or spacecraft of the invention, also provided are: a passenger terminal device which is arranged on the seat, a rail which extends in the longitudinal direction of the aircraft or spacecraft and is connected to a data processing system and/or an energy supply system, as well as an arm which is connected to the seat and displaceably engages in the rails in the longitudinal direction of the aircraft or spacecraft, the arm connecting the passenger terminal device to the data processing system and/or to the energy supply system. When the seat is moved relative to the seat rail by the seat adjustment device, the arm moves automatically with the seat. A connection between the passenger terminal device and the data processing system and/or the energy supply system is thus maintained, i.e. is not interrupted. A rewiring or the like of the passenger terminal device in the new seat position is thus not required.

According to a further preferred configuration of the aircraft or spacecraft of the invention, the seat adjustment device is coupled in terms of signalling with a cabin management system of the aircraft or spacecraft. The seat connection is positioned with respect to the seat rail by means of the seat adjustment device subject to presets from the cabin management system. Presets of this type can be input into the cabin management system, for example by a flight attendant panel.

BRIEF DESCRIPTION OF THE DRAWINGS

In the following, the invention will be described in more detail on the basis of embodiments with reference to the accompanying figures of the drawings, in which:

FIG. 2.1 shows a longitudinal section from FIG. 2;

FIG. 4.1 shows the view of FIG. 4 with an insertion adapter;

FIG. 8.1 shows the insertion adapter of FIG. 8 in a second position;

DETAILED DESCRIPTION OF THE INVENTION

In the figures, the same reference signs denote identical or functionally identical components, unless indicated otherwise.

Figure 1:
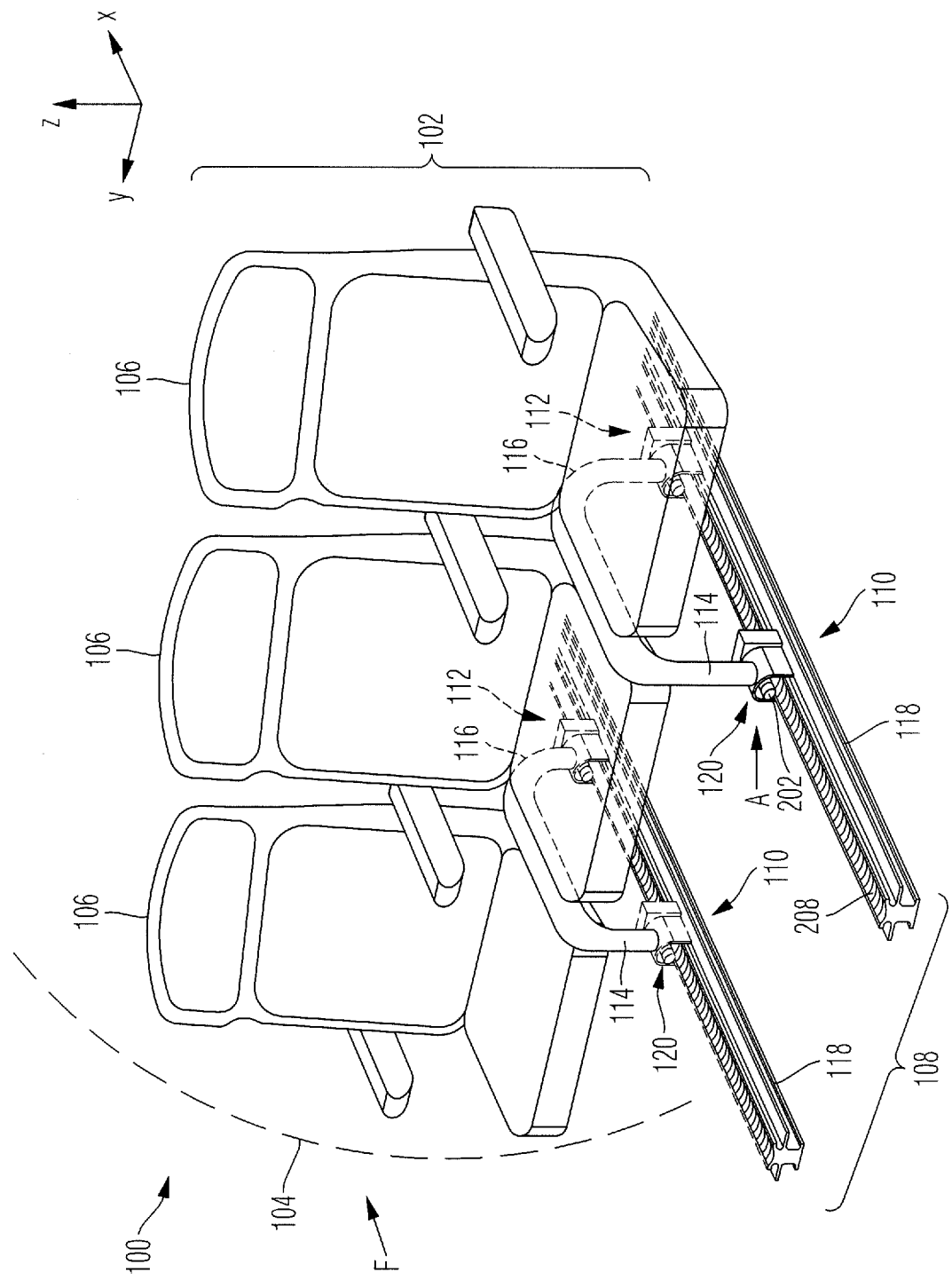
FIG. 1 is a perspective view of a detail of an aircraft according to a preferred embodiment of the present invention.

FIG. 1 is a perspective view of a detail of an aircraft, generally denoted by reference numeral 100, according to an embodiment of the present invention.

The aircraft 100 has a large number of rows 102 of seats. The rows 102 of seats are arranged behind one another in the longitudinal direction X of the aircraft 100 in a fuselage 104 of the aircraft 100. By way of example, FIG. 1 only shows one such row 102 of seats.

The row 102 of seats is composed of, for example, three seats 106 which are attached to a floor 108. This attachment is performed, for example by two seat adjustment devices 110 and two seat retaining devices 112. The seat adjustment devices 110 are each arranged, for example on a front leg 114 of the row 102 of seats and the seat retaining devices 112 are each arranged on a rear leg 116. "Rear" and "front" both relate to the longitudinal direction X.

The construction of the seat adjustment devices 110 and of the seat retaining devices 112 will be described in the following with reference to the detailed seat adjustment device 110 which is thus illustrated in solid lines. The rest of the seat adjustment device 110 which is illustrated and the illustrated seat retaining devices 112 are shown in dashed lines for a simpler presentability.

The seat adjustment device 110 is composed of a seat rail 118 which forms part of the floor 108, and a seat connection 120 which is connected to the front leg 114. The seat connection 120 or components thereof which will be described in more detail in the following can be formed integrally with the front leg 114. The connection of the seat rail 118 to further components, in particular to crossbars of the floor 108 will be described in more detail in connection with FIG. 11.

Figure 2:
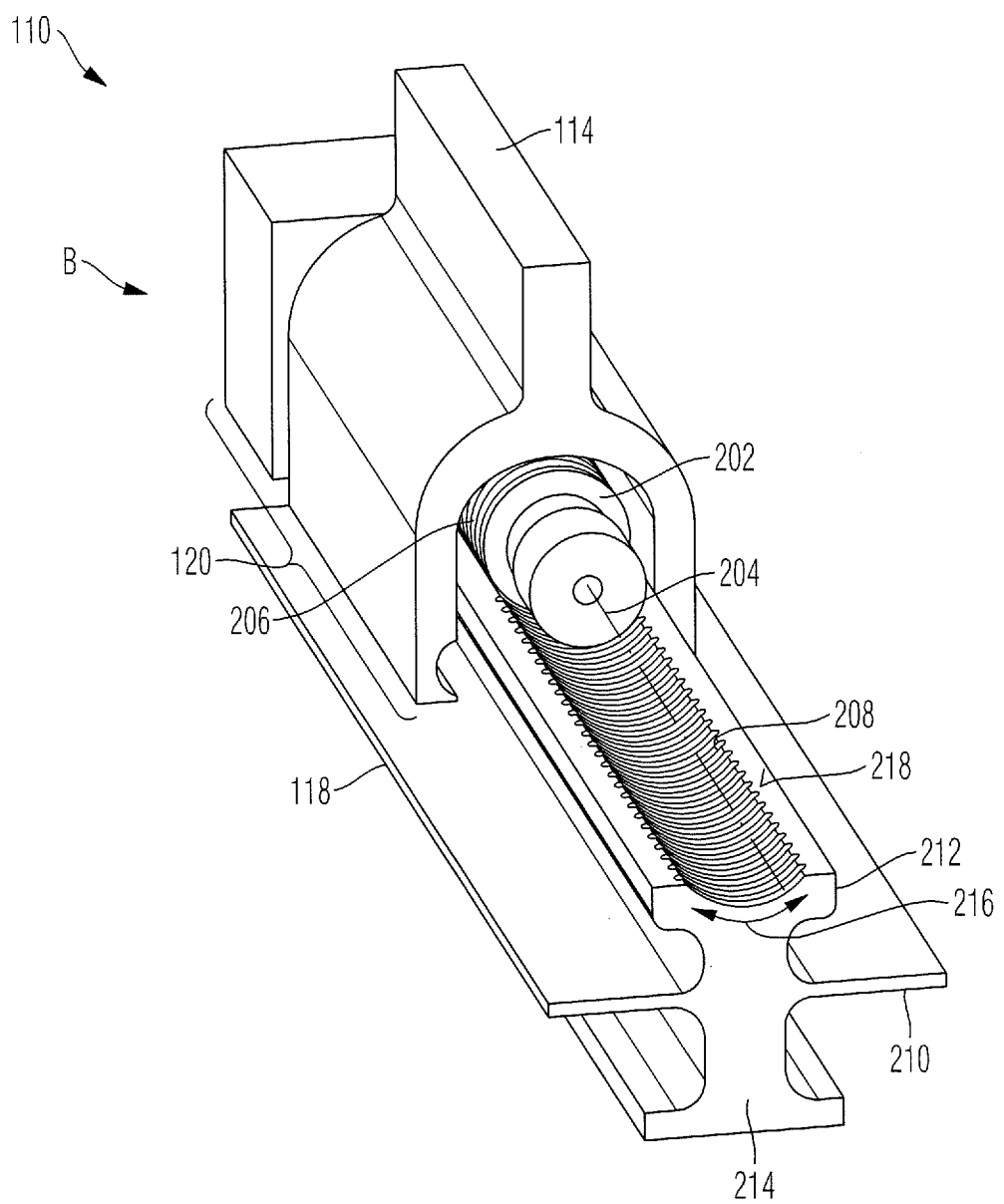
FIG. 2 is a perspective view in the direction of arrow A from FIG. 1.

FIG. 2 is a perspective view A from FIG. 1. FIG. 2.1 shows a longitudinal section from FIG. 2. Only part of the front leg 114 of the row 102 of seats is shown in FIGS. 2 and 2.1.

Figure 9:
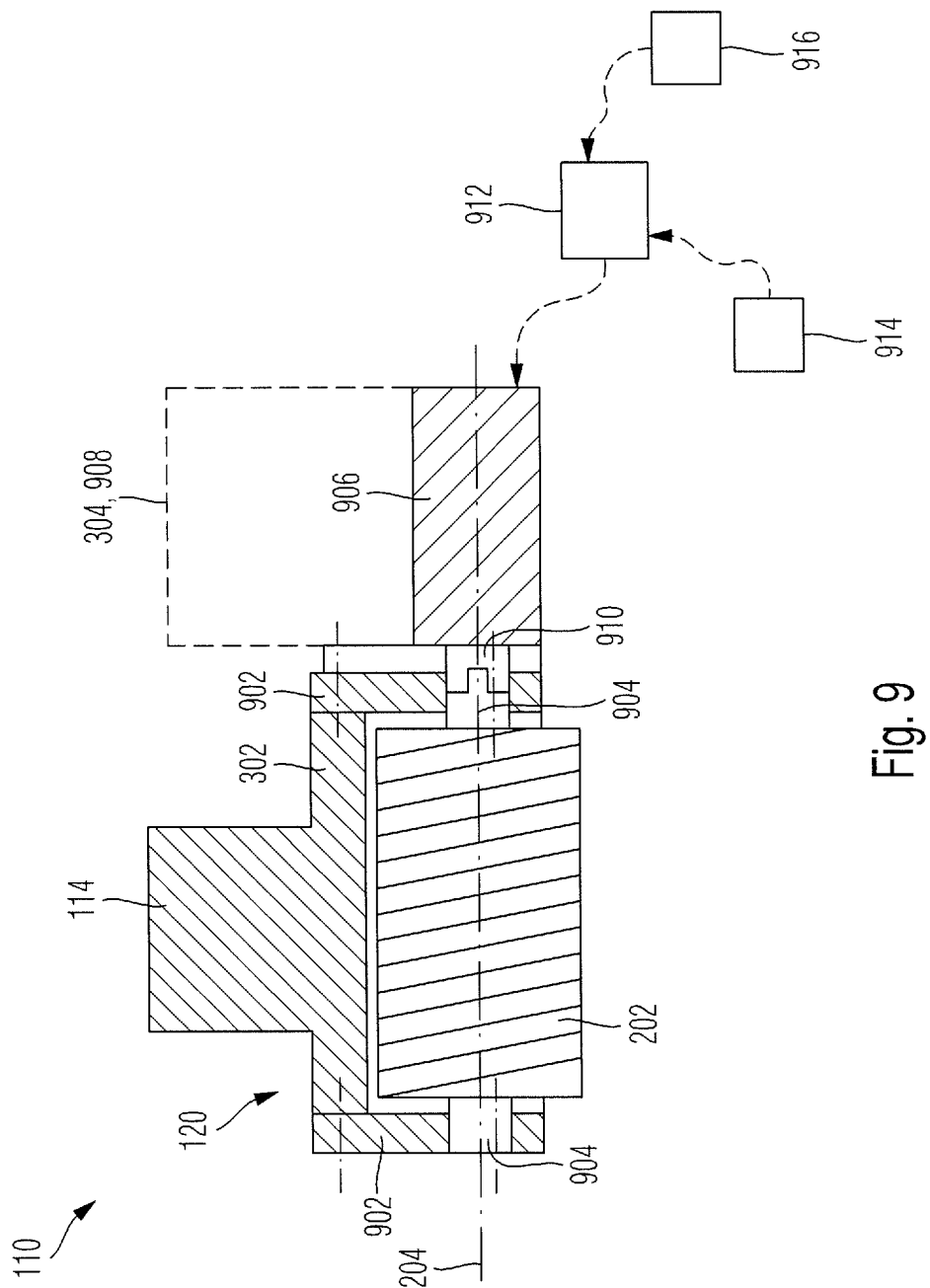
FIG. 9 shows a partial section along an axis of rotation of a worm of FIG. 2.

Referring to FIGS. 2 and 2.1, the seat adjustment device 110 also comprises a worm 202. The worm 202 is provided to adjust the seat connection 120 and thus the row 102 of seats relative to the seat rail 118 and thus to the floor 108. For this, the worm 202 is rotated about its axis of rotation 204. The worm engages by its thread 206 into teeth 208 of the seat rail 118. The worm 202 is provided to be mounted rotatably on the seat connection 120. However, appropriate bearings are shown in FIG. 9 and not in FIG. 2.

The seat rail 118 is configured as a profile, i.e. it has a substantially constant cross section 210 in its longitudinal direction which, in the present case, corresponds to the longitudinal direction X of the fuselage 104. The cross section 210 consists of a head portion 212 and a base portion 214. The head portion 212 has the teeth 208 on its upper side 218. In the present context, "upper" and "lower" relate to the vertical direction Z of the aircraft 100. The base portion 214 is connected to crossbars of the floor 108 in a manner which will be described in more detail later on.

The teeth 208 extend in portions in the peripheral direction 216 around the axis of rotation 204 of the worm 202. Thus, the teeth 208 form a recess in the upper side 218 of the head portion 212.

Figure 3:
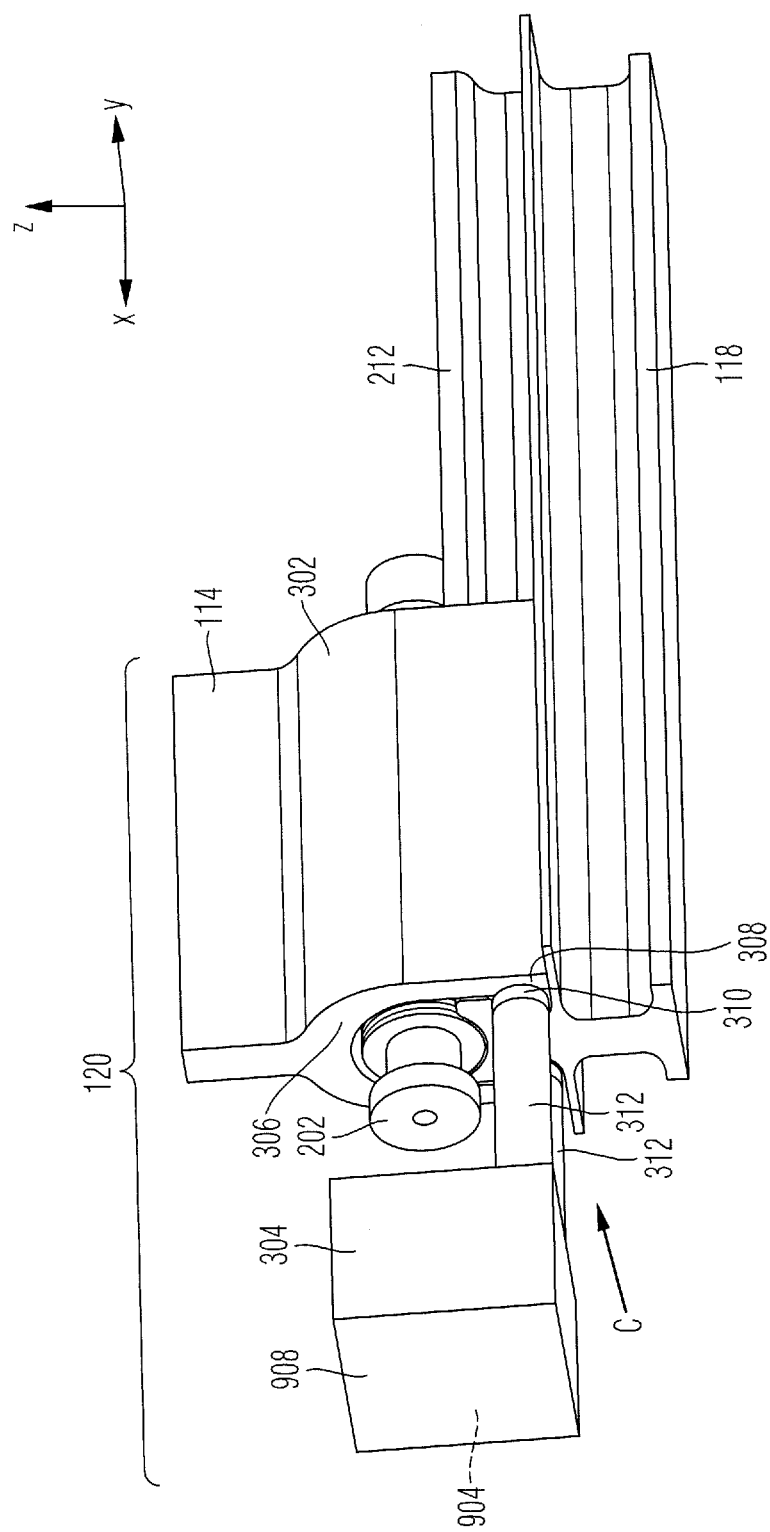
FIG. 3 is a perspective view in the direction of arrow B from FIG. 2.

FIG. 3 shows a view B from FIG. 2. The seat connection 120 engages over the head portion 212 of the seat rail 118 in a first direction transverse to the seat rail 118 which coincides with the transverse direction Y of the aircraft 100, see FIG. 1. Furthermore, the seat connection 120 engages over the seat rail in a second direction transverse to the longitudinal direction X of the seat rail 118, which coincides with the vertical direction Z of the aircraft 100, see FIG. 1.

The seat connection 120 consists of a seat adapter 302 and an insertion adapter 304. The seat adapter 302 is rigidly connected to the leg 114 of the row 102 of seats, and in particular is formed integrally therewith. For the engagement over the seat rail 118 or the head portion 212 thereof in the vertical direction Z, the insertion adapter 304 is engaged with the seat adapter 302, as shown in FIGS. 1 and 2. To provide a clearer understanding, FIG. 3 shows the seat adapter 302 and the insertion adapter 304 in a non-engaged state.

Figure 4:
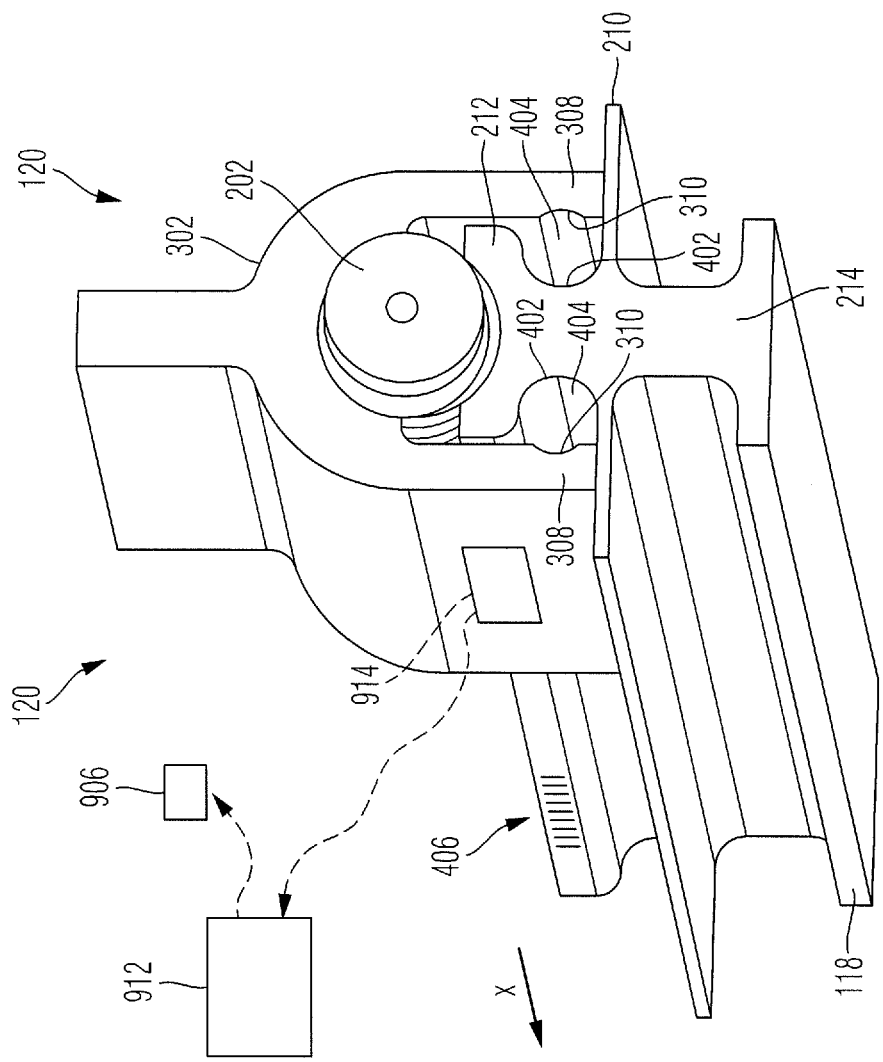
FIG. 4 is a perspective view in the direction of arrow C from FIG. 3 without an insertion adapter.

When observed in the longitudinal direction X, the seat adapter 302 has an upside-down U-shape 306. The U-shape 306 encompasses the worm 202 and the head portion 212. The free ends 308, see also FIG. 4, are located downstream of the head portion 212, based on the worm 202, and there form a respective receiving element 310. The insertion adapter 304 has engagement elements 312. The engagement elements 312 can be engaged with the receiving elements 310. According to the illustrated embodiment, the engagement elements 312 are each configured as a pin. The receiving elements 310 are each configured as approximately semicircular recesses, see also FIG. 4.

FIG. 4 shows a view C from FIG. 3. FIG. 4.1 shows the view from FIG. 4 with the insertion adapter 304. Referring to FIG. 4, the head portion 212 adjoins the base portion 214 in a tapering manner so that approximately semicircular recesses 402 are formed on both sides of the cross section 210. The recesses 310 and the recesses 402 together form a respective approximately fully circular recess 404, into which the pins 312 can be respectively inserted, as shown in FIG. 4.1. The positive locking formed thereby in the vertical direction Z will be described in more detail in the following with reference to FIGS. 5 and 6.

Figure 5:
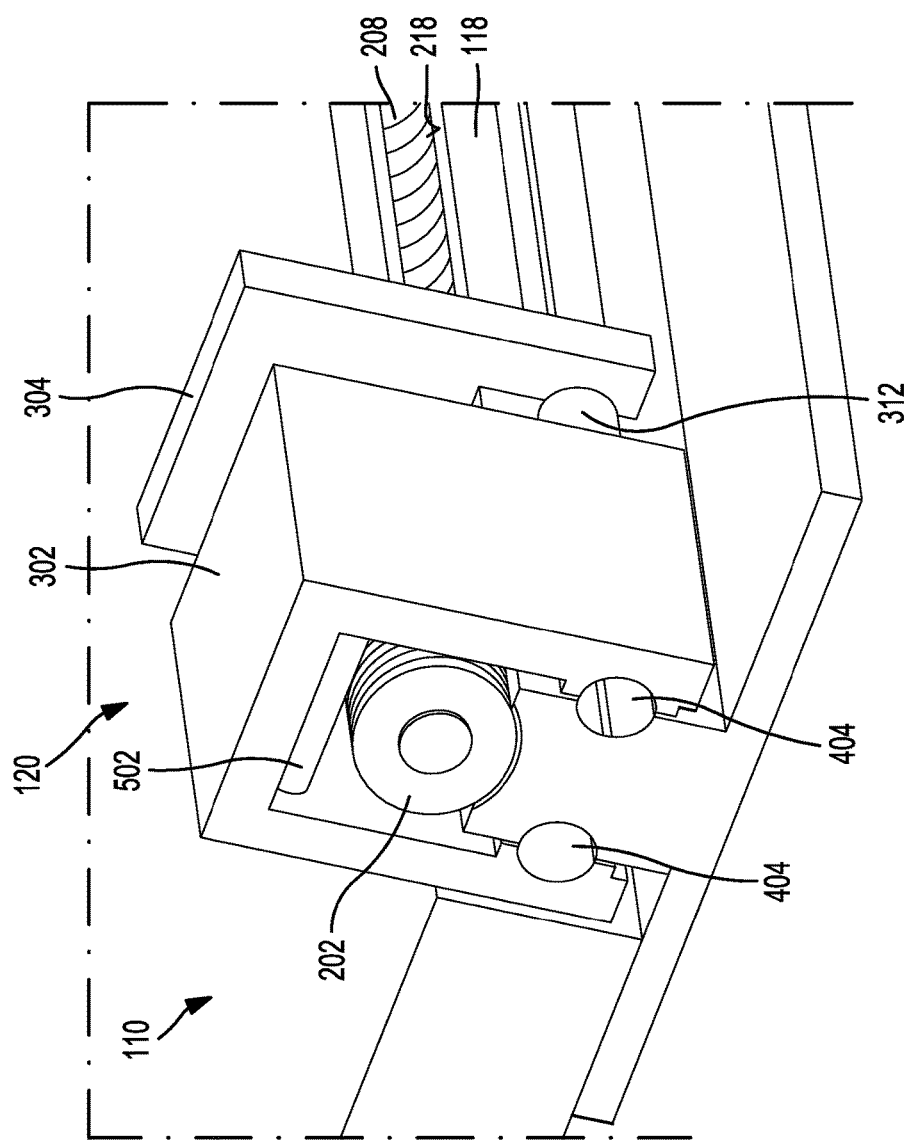
FIG. 5 is a simplified, perspective view of a seat adjustment device of FIG. 4.
Figure 6:
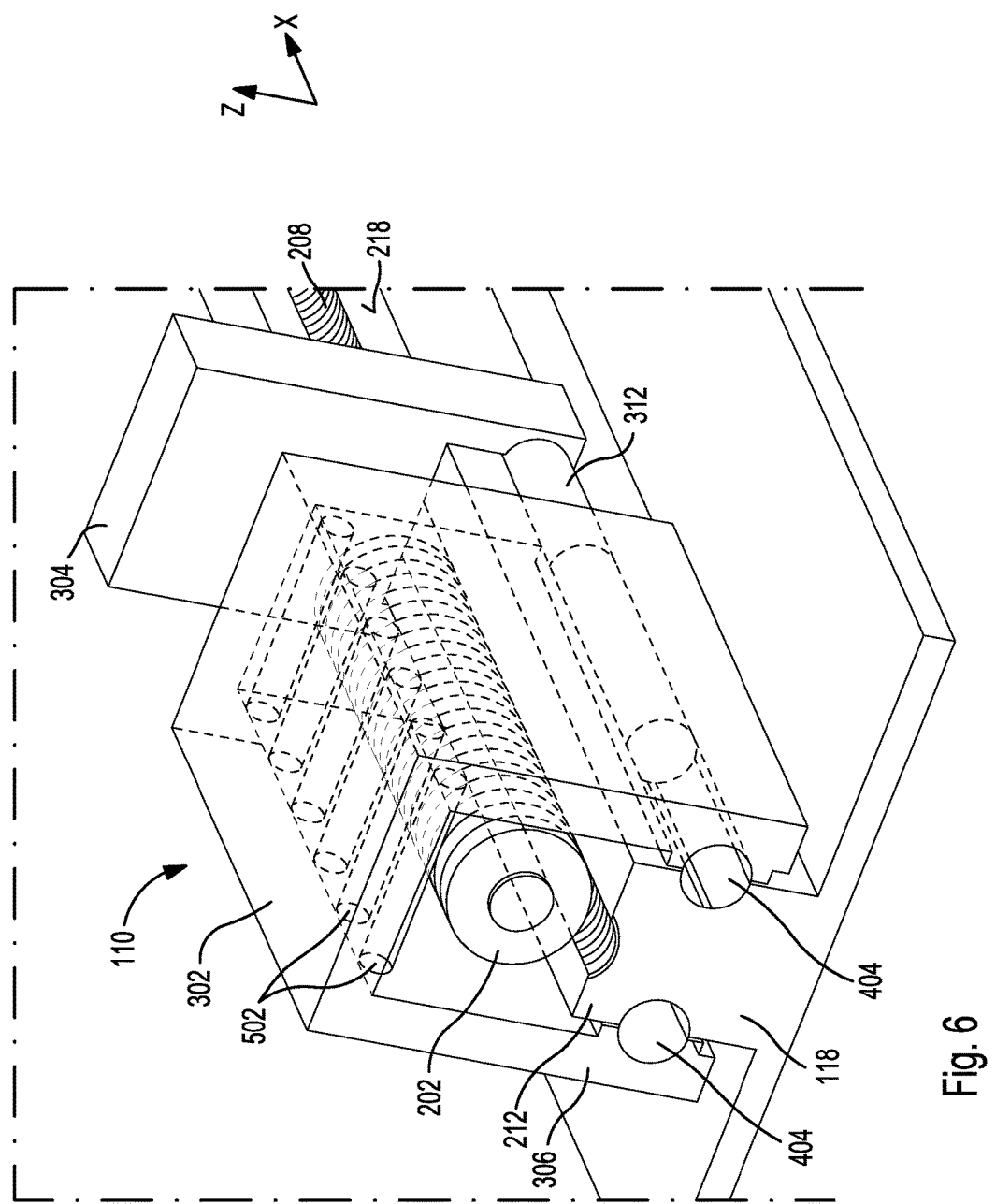
FIG. 6 shows the view of FIG. 5, where a seat adapter of a seat connection is presented as being transparent for a clearer understanding.

The seat rail 118 can be provided with a marking 406 in the longitudinal direction X, the purpose of which is described in connection with FIG. 9. FIG. 5 is a simplified, perspective view of the seat adjustment device 110 from FIG. 4. FIG. 6 shows the illustration of FIG. 5, with the seat adapter 302 presented as being transparent to provide a clearer understanding.

The pins 312 inserted into the recesses 404 in the longitudinal direction X engage behind the head portion 212, thereby preventing the seat adapter 302 from being pulled off the seat rail 118 in the vertical direction Z (see FIG. 5).

Furthermore, the seat connection 120 can be mounted such that it slides on the seat rail 118 by means of rolling bodies 502. For example, it is possible for rolling bodies 502, see also FIG. 6, to be configured as needles 502 which are mounted on the seat adapter 302 and roll on the upper side 218 of the head portion 212 of the seat rail 118. Alternatively, the rolling bodies 502 can also roll on the flange 1006, see FIG. 10.

Figure 7:
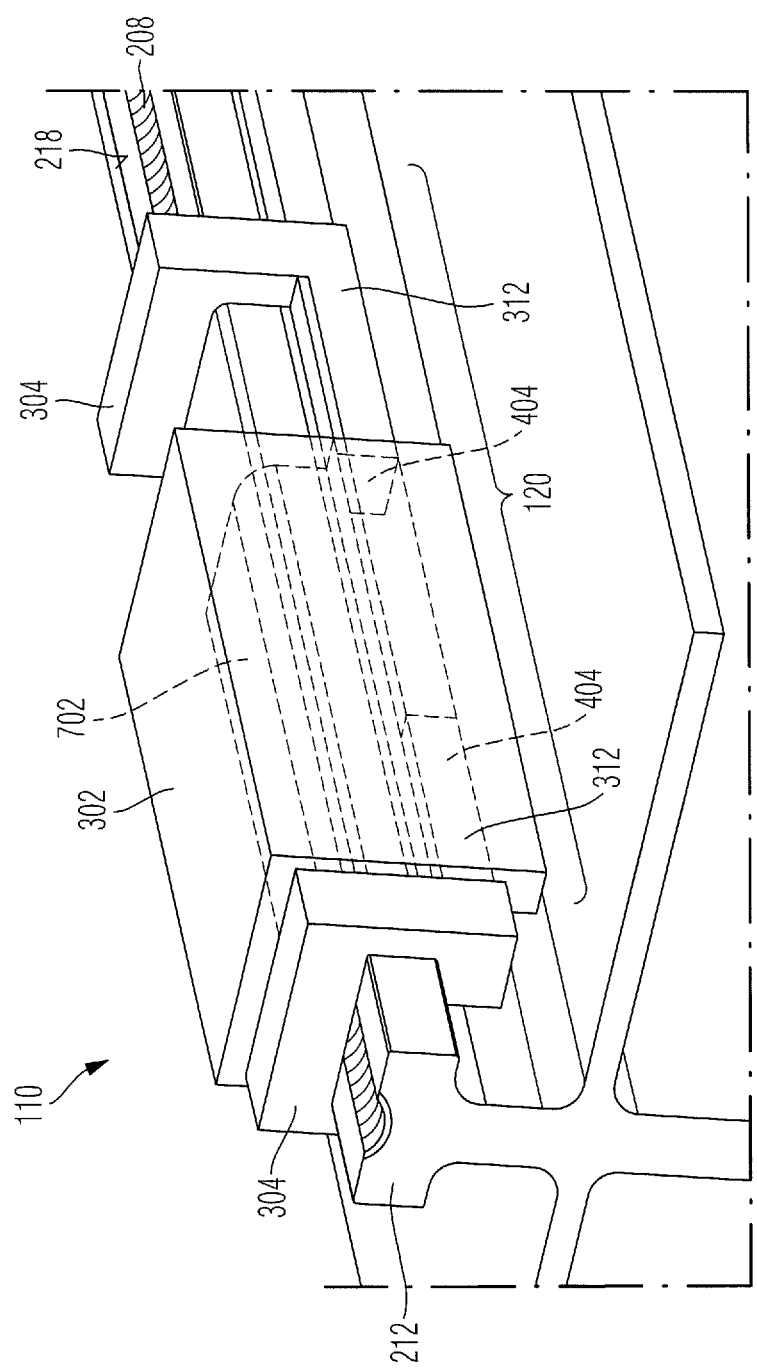
FIG. 7 is a perspective view of a variation with respect to the embodiment according to FIG. 5.

FIG. 7 is a perspective view of a variation with respect to the embodiment according to FIGS. 5 and 6. The seat connection 120 according to FIG. 7 firstly differs from the seat connection 120 according to FIGS. 5 and 6 in that two insertion adapters 304 are provided which are inserted from opposite sides into the one seat adapter 302. Furthermore, FIG. 7 shows that the engagement elements 312 and the correspondingly formed recesses 404 can also have a rectangular cross section, for example, instead of a circular cross section. In addition, in the seat adjustment device 110 according to FIG. 7, the rolling bodies 502 are not used. Instead, a sliding bearing is provided, for example in the form of a Teflon coating 702 (indicated only) on the seat adapter 302, said sliding bearing sliding on the upper side 218 of the head portion 212.

Figure 8:
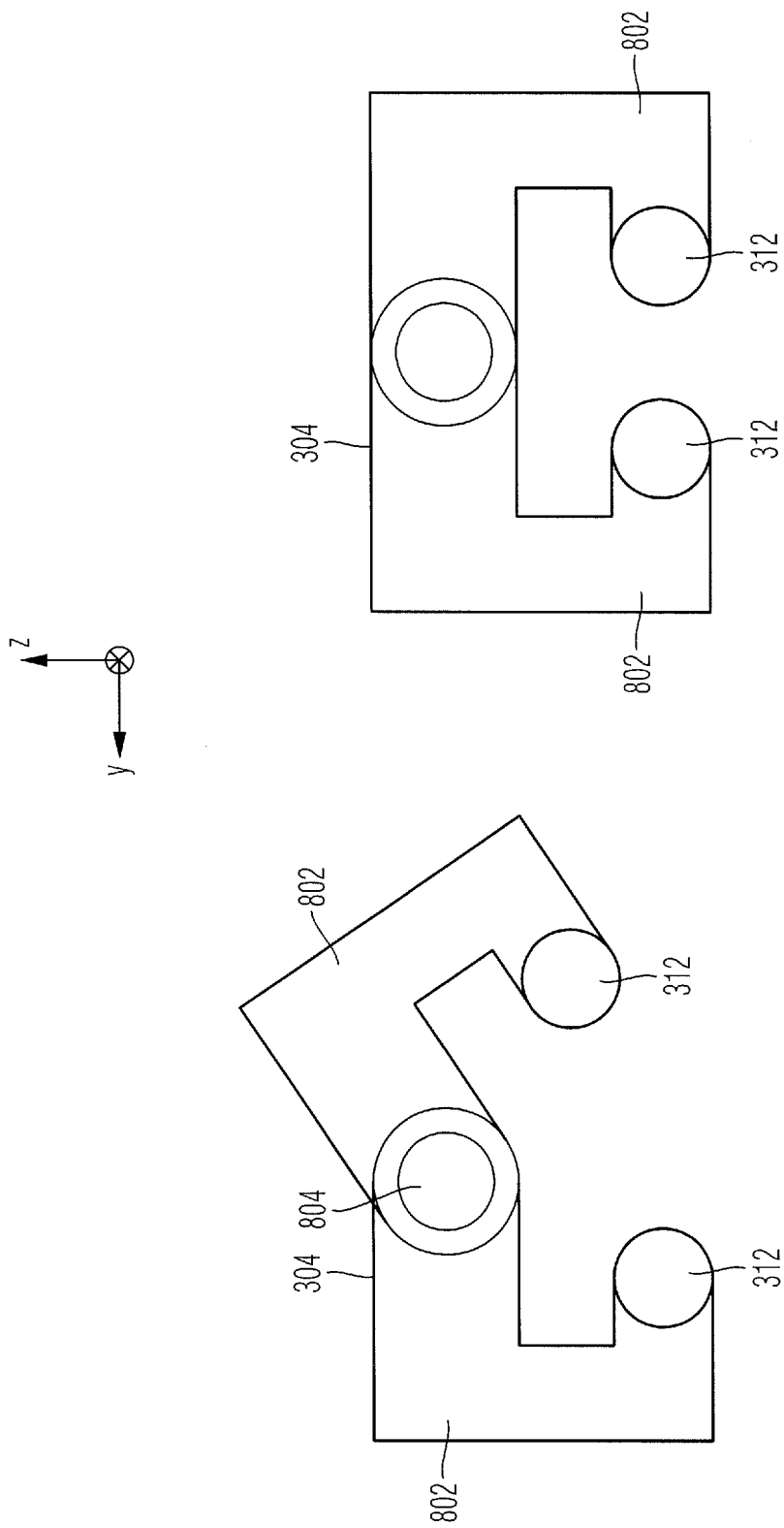
FIG. 8 is a front view of an insertion adapter in a first position according to an embodiment of the present invention.

FIGS. 8 and 8.1 respectively show the insertion adapter 304 from FIGS. 5 to 7 in a plan view, i.e. seen in the longitudinal direction X, in a slightly modified form. The insertion adapter 304 can consist of two portions 802 which are linked together by a joint 804. The joint 804 and the portions 802 are also indicated in FIG. 6. The portions 802 each carry at their ends, opposite the joint 804, the engagement element 312.

FIG. 8 shows the insertion adapter 304 in an opened position, so that it can be pushed onto the head portion 212 in the vertical direction Z, see for example FIG. 6. Thereafter, the insertion adapter 304 is brought into its closed position, shown in FIG. 8.1, which corresponds to the position of the insertion adapter 304 shown in FIG. 6. In the closed position, the engagement elements 312 engage behind the head portion 212 in the previously explained manner. The portions 802 can be L-shaped, for example, see FIG. 6, or U-shaped, see FIGS. 8 and 8.1. The insertion adapter 304 is fixed in the closed position, see FIG. 8.1, so that it can no longer automatically move into its opened position, see FIG. 8. This is simply achieved, for example in that the insertion adapter 304 is inserted into the seat adapter 302, in other words the engagement elements 312 are pushed into the receiving elements 310. Instead of the insertion adapter 304 being configured in an articulated manner, illustrated in FIGS. 8 and 8.1, it could also be configured in two parts, so that the portions 802 can be simply arranged in the position or arrangement illustrated in FIG. 6 independently of one another and, if appropriate, can be connected to one another. Thereafter, the optionally interconnected portions 802 are moved such that their respective engagement elements 312 pass into the recesses 404, thereby producing the positive locking described above.

FIG. 9 shows a section along the axis of rotation 204 of the worm 202 through the seat adjustment device 110 and, to provide a clearer understanding, some components from FIG. 2 have been omitted and other components have been added. For example, FIG. 9 does not show the seat rail 118.

For example, the seat connection 120 can have bearings 902 which the worm 202 supports at its opposing ends such that it can rotate about its axis of rotation 204. In particular, the bearings 902 are arranged, for example screwed on, at opposite ends of the seat adapter 302.

To rotate the worm 202 about its axis of rotation 204, a drive means 906 is provided, for example in the form of an electric motor. The electric motor 906 is preferably arranged in the insertion adapter 304, see FIG. 3. More preferably, the drive means 906 is arranged in a support portion 908 of the insertion adapter 304, which portion 908 supports the engagement elements 312. The support unit 908 is merely indicated in FIG. 9 and is thus illustrated in dashed lines. As described in connection with FIGS. 8 and 8.1, the support unit 908 can be of a separable or articulated configuration to allow the insertion adapter 304 to be pushed onto the head portion 212 of the seat rail 118 in the vertical direction Z.

The drive means 906 preferably has a coupling 910 which automatically enters into a rotational engagement with one end 904 of the worm 202 when the insertion adapter 304 is inserted into the seat adapter 302, see FIG. 3.

The drive means 906 is connected, in particular wirelessly, to a cabin management system 912 of the aircraft 100. In turn, the cabin management system 912 is connected, in particular wirelessly, to a sensor 914. The sensor 914 is also shown in FIG. 4. The sensor 914 is preferably integrated into the seat connection 120, particularly into the seat adapter 302. The sensor 914 detects a change in position of the seat connection 120 relative to the seat rail 118 in the longitudinal direction X. The marking 406, for example, on the seat rail 118, see FIG. 4, can be provided for this purpose. In FIG. 4, the marking 406 is only shown by way of example and thus only part of it is shown. The sensor 914 visually detects the markings 406 and measures its change in position based on said markings.

An input means 916 is also provided which is connected to the cabin management system 912. Said input means 916 is in particular a flight attendant panel, i.e. an input means for flight attendants. The cabin management system 912 can be provided with a desired seating layout by the input means 916. The cabin management system 912 then compares the desired position and the actual position of a respective row 102 of seats. If there is a difference between the desired and actual positions, the cabin management system 912 activates the drive means 906 which then rotates the worm 202 about its axis of rotation 204. As a result, the position of the row 102 of seats is adjusted relative to the floor 108 in the longitudinal direction X. The cabin management system 912 checks the respective position of the row 102 of seats by means of the sensor 914. If this position corresponds to the desired position, the drive means 906 stops. For this purpose, the drive means 906 can simply be connected without current, for example. Due to the self-locking of the worm 202, the desired position of the row 102 of seats is then fixed, even under the effect of considerable flight loads.

The construction of the seat retaining devices 112, see FIG. 1, corresponds to that of the seat adjustment devices 110 except that the seat retaining devices 112 do not have a worm and accordingly do not have a drive means 906 either. In FIG. 1, the seat adjustment devices 110 and the seat retaining devices 112 could also be interchanged in the longitudinal direction X. This means that in FIG. 1, the seat retaining devices 112 would be arranged in front and the seat adjustment devices 110 would be arranged behind in the row 102 of seats. An arrangement of this type of the seat adjustment devices 110 and of the seat retaining devices 112 can be advantageous in that the main weight of the row 102 of seats is then loaded onto the seat adjustment devices 110.

Furthermore, it is mentioned that the cabin management system 912 preferably controls the drive means 906 of the two seat adjustment devices 110 at the same time, see FIG. 1, thereby avoiding a tilting action between said two seat adjustment devices 110.

Figure 10:
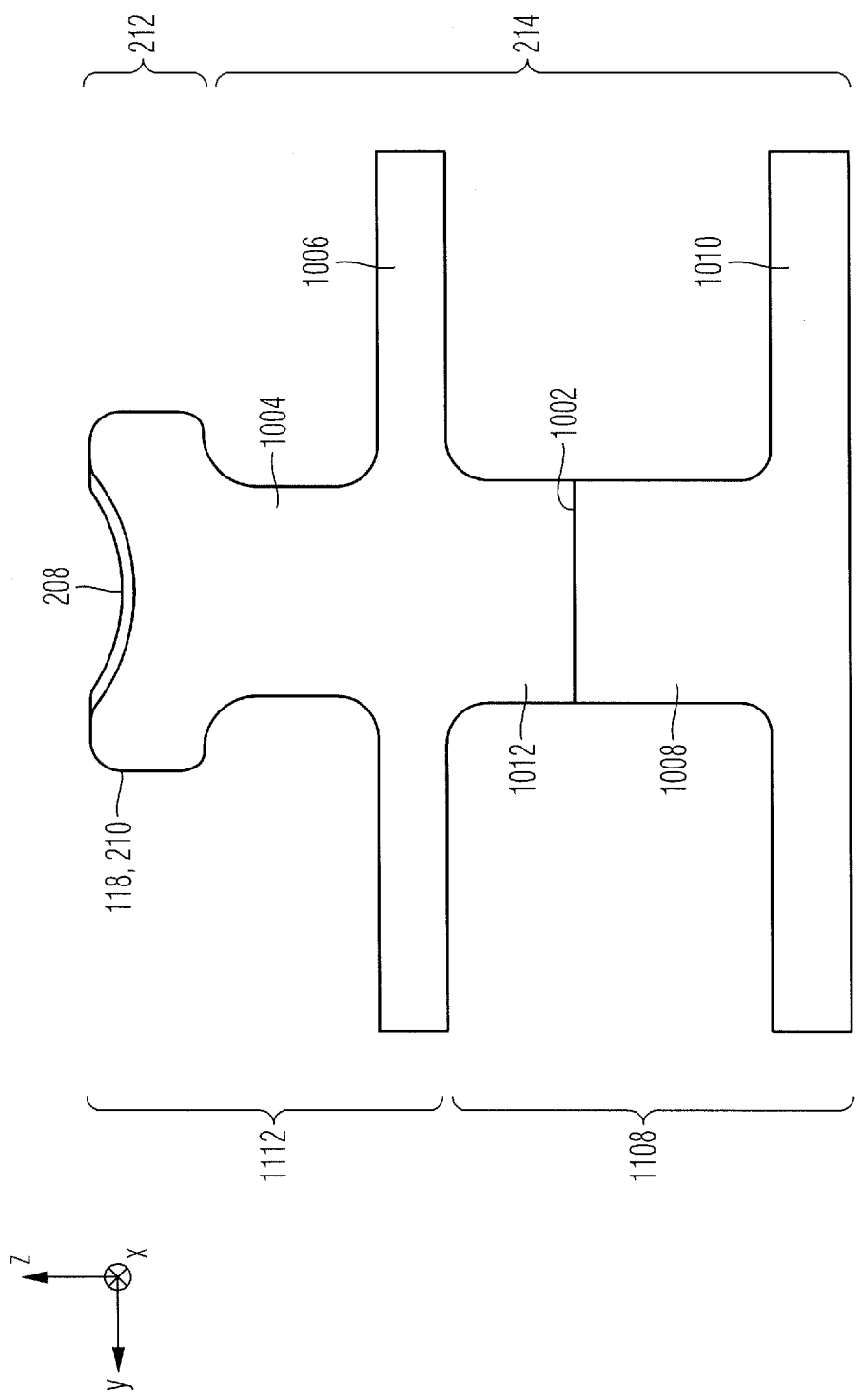
FIG. 10 is a cross-sectional view of a seat rail of FIG. 2.

FIG. 10 shows the seat rail 118 from FIG. 1, seen in the longitudinal direction X.

The cross section 210 of the seat rail 118 is preferably composed of the head portion 212 and of the base portion 214 which are interconnected in an integral manner. The head portion 212 can, for example, adjoin the upper end of a web 1004 of the base portion 214. The base portion 214 can have a flange 1006 at the lower end of the web 1004. A web 1012 can adjoin the underside of the flange 1006. The web 1012 is preferably attached to a web 1008 by an attachment site 1002, and in turn the web 1008 is connected at its lower end to a flange 1010.

According to the present embodiment, the base portion 214 comprises the flanges 1006 and 1010 as well as the webs 1012 and 1008, thereby substantially producing an I shape for the base portion 214 which has on the upper side a connection (web 1004) for the head portion.

The base portion 214 is provided for attaching the seat rail 118 to the floor 108. In the present context, "for attaching the seat rail 118 to the floor 108" should also include the case in which the base portion 214 is part of the floor 108, as shown in FIGS. 11 and 12.

The head portion 212 is preferably produced from a wear-resistant material, such as titanium, because said head portion 212 comprises the heavily stressed teeth 208. The base portion 214 preferably comprises a light and economical material, such as aluminium. The webs 1004 and 1012 as well as the flange 1006 of the base portion 214 are preferably made of titanium and the web 1008 and the flange 1010 of the base portion 214 are preferably made of aluminium. At the attachment site 1002, the webs 1012 and 1008 are preferably interconnected in an integral manner, in particular by laser welding, electron beam welding or friction stir welding. A weld in the region of the attachment site 1002 can be formed, for example as described in DE 10 2004 026 228 A1.

Figure 11:
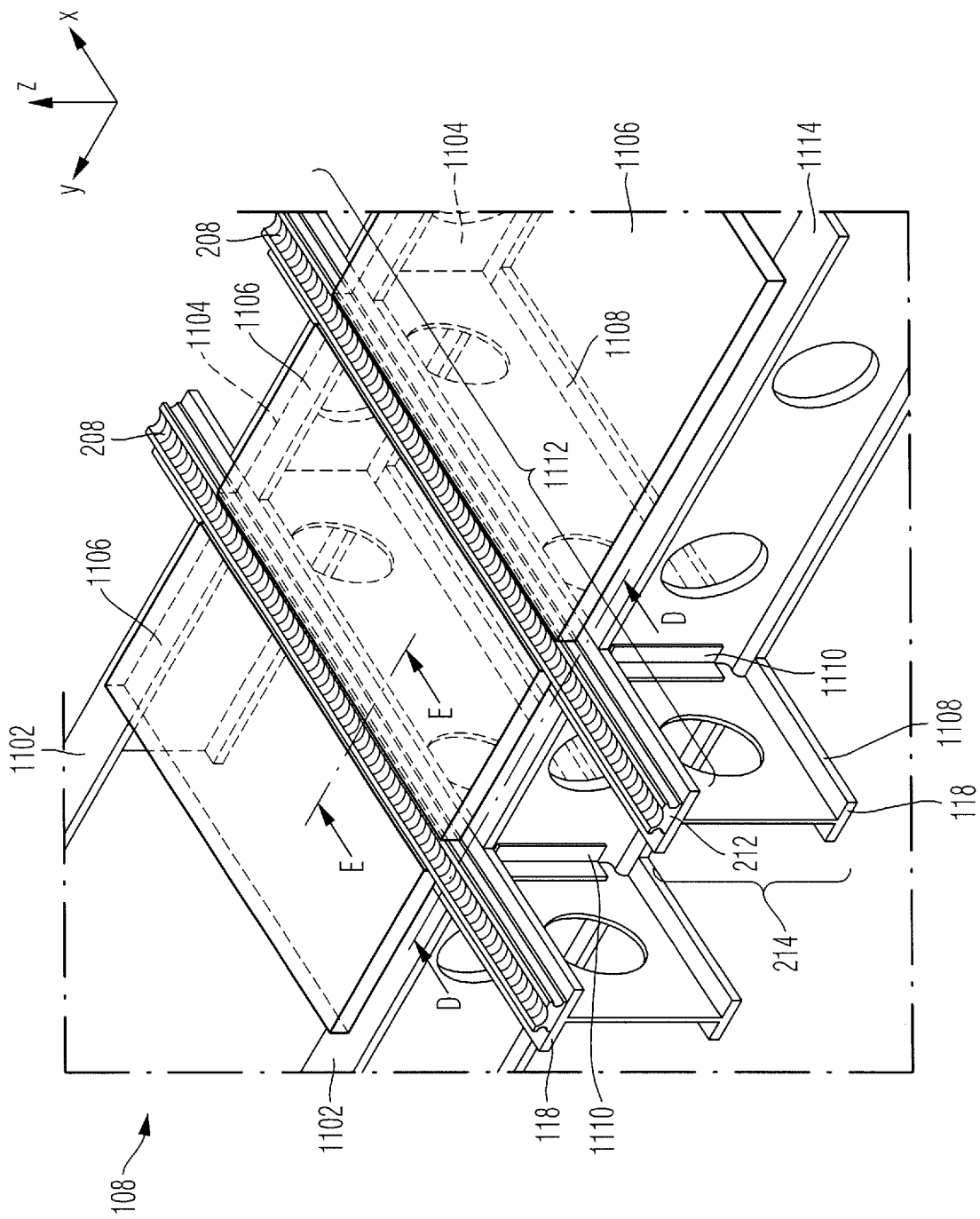
FIG. 11 is a detailed, perspective view of a floor of FIG. 1.
Figure 12:
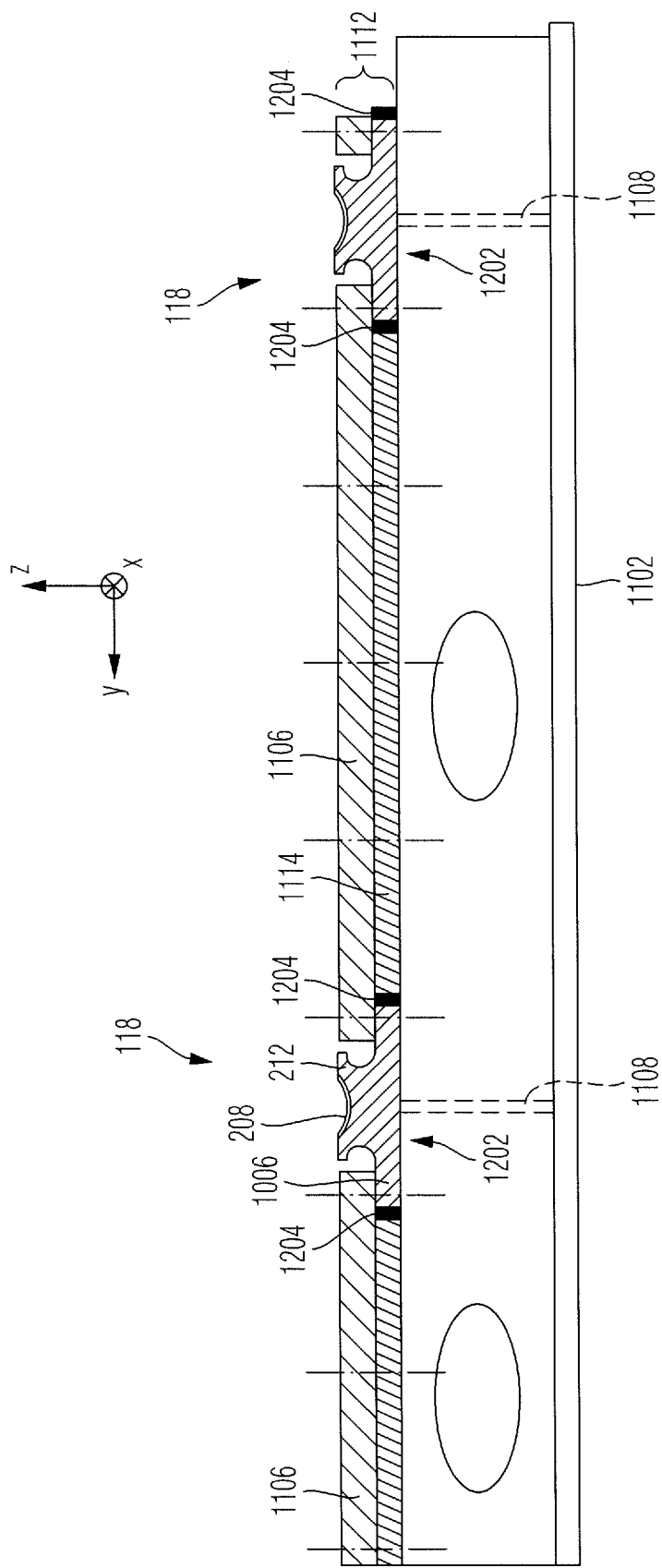
FIG. 12 shows a section D-D from FIG. 11.

FIG. 11 is a detailed, perspective view of the floor 108 from FIG. 1. FIG. 12 shows a section D-D from FIG. 11. The seat rails 118 form longitudinal supports of the floor 108 which are connected to crossbars 1102 of the floor 108 and thus form a grid-like structure. Floor plates 1106 are arranged in the cells 1104 defined by the seat rails 118 and the crossbars 1102.

In the longitudinal direction X, the seat rail 118 is composed of a large number of segments 1108 which are each interrupted in the region of the crossbars 1102. The segments 1108 are inversely T-shaped, as illustrated in FIG. 10. At their respective ends, the T-shaped segments 1108 adjoin the crossbars, for example by angles 1110. The angles 1110 can be screwed, riveted or welded together with the crossbars 1102 and the seat rails 118, in particular with the T-shaped segments 1108, for example.

On the other hand, a portion 1112, which is approximately I-shaped in cross section, of the seat rail 118, see also FIG. 10, extends through the crossbars 1102 in one piece. The portion 1112 comprises, for example, the flange 1006, the web 1004 and the head portion 212. An upper flange 1114 of the crossbar 1102, which preferably has an I-shaped cross section, is configured to be interrupted for this purpose, thereby producing openings 1202 in the crossbar 1102, through which the portion 1112 can extend.

The flange 1006 of the seat rail 118 is preferably welded at its opposing ends to the flange 1114 of the crossbar 1102 at welding points 1204 in the transverse direction Y. Since these welding points 1204 are positioned at the top, they are easily accessible for a suitable welding device, a laser, for example.

Figure 13:
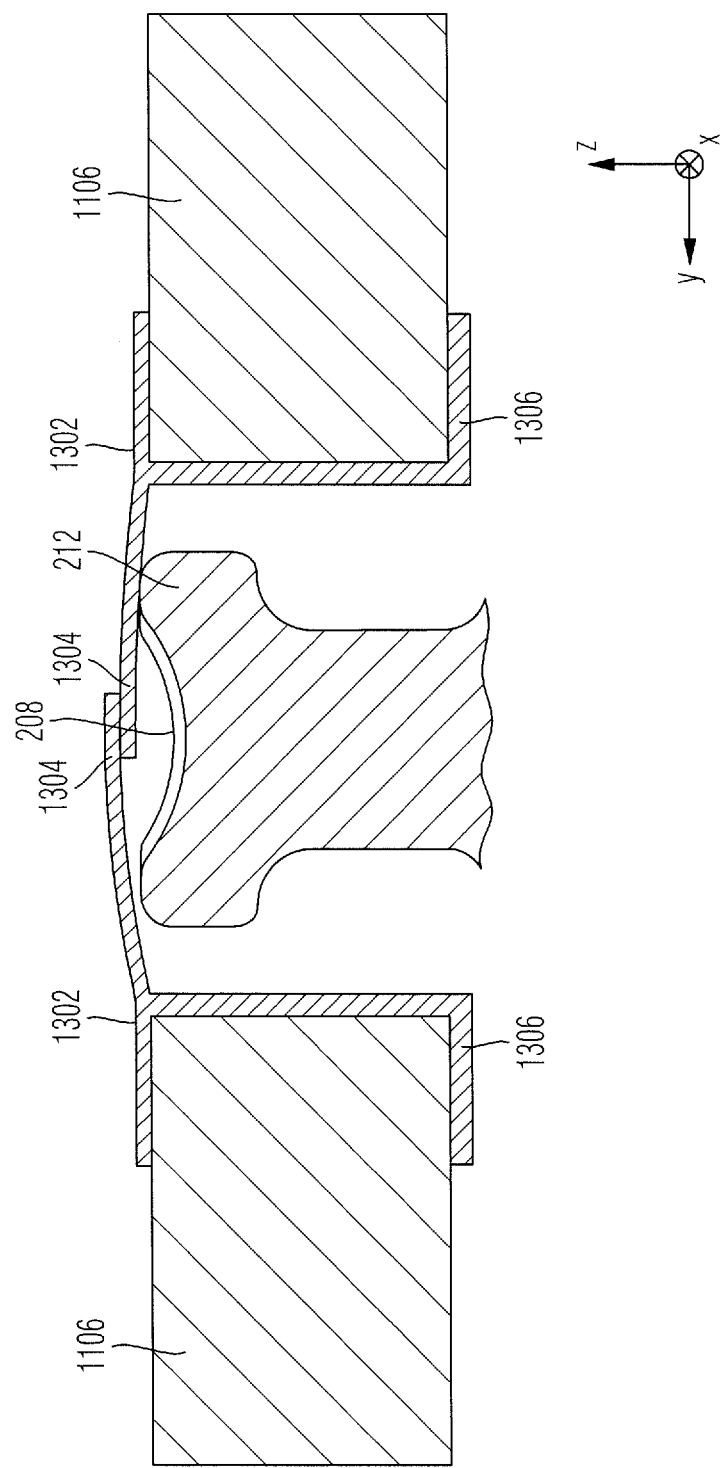
FIG. 13 shows a section E-E from FIG. 11.

FIG. 13 shows a section E-E from FIG. 11. Two sealing lips 1302 are preferably provided, which overlap the top of the head portion 212, in particular the teeth 208, with their free ends 1304. More preferably, the free ends 1304 of the sealing lips 1302 overlap one another, so that the teeth 208 are completely covered in the vertical direction Z. At their opposite ends 1306, the sealing lips 1302 can be attached to the floor plates 1106 on both sides of the head portion 212.

The sealing lips 1302 thus protect the seat rail 118, in particular the teeth 208 thereof, against grime and the like. At the same time, they allow the seat adjustment devices 110 and the seat retaining devices 112 to move along the rails 118, because they can be resiliently pushed away by the seat adjustment device 110 and the seat retaining device 112 to uncover the teeth 208.

Figures 14, 15:
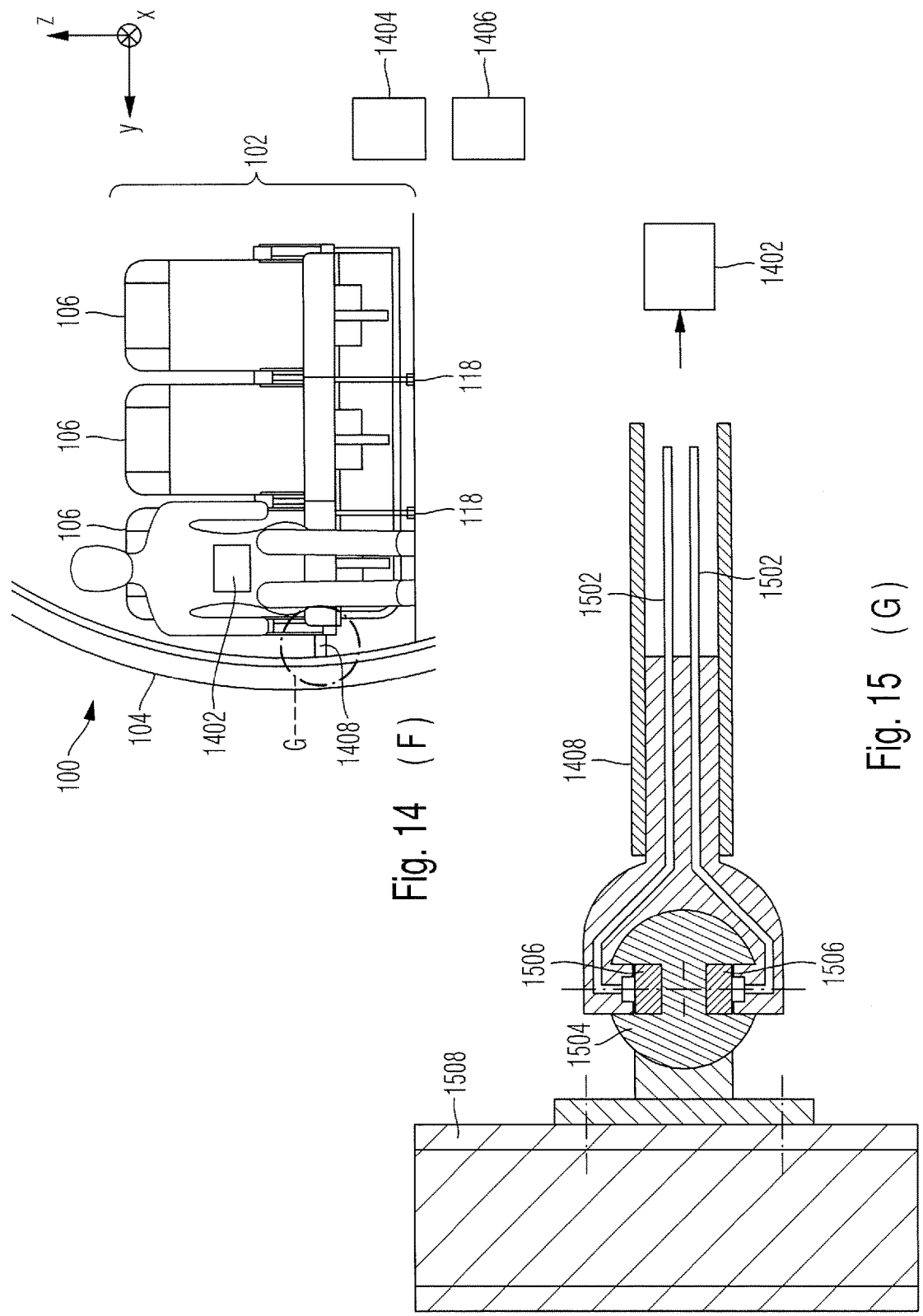
FIG. 14 is a view in the direction of arrow F from FIG. 1.
FIG. 15 is an enlarged view G from FIG. 14.

FIG. 14 shows a view F from FIG. 1 and FIG. 15 shows an enlarged view G from FIG. 14.

Passenger terminal devices 1402 can be allocated to a respective row 102 of seats or to a respective seat 106. The passenger terminal devices 1402 can be, for example a monitor for displaying an entertainment programme or a button for calling a flight attendant (paxcall). These passenger terminal devices 1402 are mechanically connected to the row 102 of seats so that when the position of the row 102 of seats is adjusted in the longitudinal direction X, the passenger terminal devices 1402 should be entrained. However, supplying the passenger terminal devices 1402 with data and/or with energy from a data processing system and/or an energy supply system of the aircraft 100 should also be ensured at the same time. An example of a data processing system is an in-flight entertainment system 1404, schematically indicated in FIG. 14. An example of an energy supply system is an on-board network 1406 indicated in FIG. 14.

For connection to the in-flight entertainment system 1404 and to the on-board network 1406, the row 102 of seats has a preferably flexible arm 1408 made, for example of resilient plastics material, which is rigidly connected at one end to the row 102 of seats. The arm 1408 carries electrical lines 1502 which lead to the passenger terminal device 1402. At its other end, the arm 1408 engages in a rail 1504. The rail 1504 is connected to the in-flight entertainment system 1404 and to the on-board network 1406 in a manner which is not described in more detail. An electrical connection between the arm 1408 and the rail 1504 for the transfer of data and energy can be produced by appropriate sliding contacts 1506. The arm 1408 is engaged with the rail 1504 such that it can be displaced in the longitudinal direction X. Thus, an electrical connection is maintained between the passenger terminal device 1402 and the in-flight entertainment system 1404 and the on-board network 1406 even when the row 102 of seats is repositioned by means of the seat adjustment devices 110.

The rail 1504 extends in the longitudinal direction X through the fuselage 104 and can be attached, for example to formers 1508 in the transverse direction Y next to a respective row 102 of seats. Due to the fact that the arm 1408 is flexible, it is possible to compensate for variations in the spacing between the row 102 of seats and the seat rail 1504.

Although the invention has been described above with reference to preferred embodiments, it is not restricted thereto, but can be modified in many different ways. In particular it is pointed out that the configurations and embodiments described for the seat adjustment device according to the invention can be applied analogously to the aircraft and spacecraft according to the invention. Furthermore, it should be noted that in the present context, "one" does not exclude a plurality.

The invention claimed is:

1. A seat adjustment device for an aircraft or spacecraft, comprising:
   a seat rail for connection to a floor; and a seat connection for connection to a seat;

wherein a worm is provided which can be actuated to adjust the seat connection relative to the seat rail, wherein the seat rail has teeth and the seat connection supports the worm in a rotatably mounted manner, the teeth meshing with the worm, and the seat rail is configured as a profile with a head portion which comprises the teeth, the seat rail comprising a base portion and the head portion, wherein the head portion has the teeth on its upper side in a vertical direction of the aircraft or spacecraft, and wherein a respective leg of a row of seats is formed in a one-piece construction with the seat connection, the seat connection being adjustable relative to the seat rail;

wherein the seat connection comprises a seat adapter and an insertion adapter which can be brought into engagement with one another, by the insertion adapter being inserted, at least partially, into the seat adapter in a longitudinal direction of the seat rail, for engagement over the seat rail in a transverse direction of the seat rail; and wherein the seat adapter engages around the head portion of the seat rail and is configured with a receiving element and the insertion adapter comprises an engagement element which can be brought into engagement with the receiving element and the head portion.

2. The seat adjustment device according to claim 1, wherein the base portion adjoins the head portion.

3. The seat adjustment device according to claim 2, wherein the base portion comprises aluminum.

4. The seat adjustment device according to claim 2, wherein the head portion comprises titanium.

5. The seat adjustment device according to claim 1, wherein the teeth partly extend in a peripheral direction around an axis of rotation of the worm.

6. The seat adjustment device according to claim 1, wherein the seat connection engages over the seat rail in the transverse direction of the seat rail.

7. The seat adjustment device according to claim 6, wherein the seat connection engages over the head portion of the seat rail in the transverse direction of the seat rail.

8. The seat adjustment device according to claim 1, wherein the engagement element is configured as a pin, the receiving element is configured as an approximately semicircular recess, and the seat rail is configured with a corresponding, approximately semicircular, recess behind the head portion, the two semicircular recesses complementing one another to form an approximately fully circular recess into which the pin can be inserted in the longitudinal direction of the seat rail.

9. The seat adjustment device according to claim 1, wherein the seat connection comprises a seat adaptor and an insertion adaptor, wherein the seat adapter has bearings which mount the worm at its opposing ends, and wherein the insertion adapter comprises a drive which can be actively connected to the worm for actuation thereof by engagement of the insertion adapter with the seat adapter.

10. The seat adjustment device according to claim 9, wherein the insertion adapter comprises an electric motor.

11. The seat adjustment device according to claim 1, wherein two sealing lips are provided which cover the seat rail with their free ends.

12. Seat adjustment device according to claim 1, wherein the seat connection is mounted such that it slides and/or rolls on the seat rail, the seat connection preferably comprising rolling bodies which are supported on the head portion of the seat rail.

13. The seat adjustment device according to claim 11, wherein the two sealing lips cover the teeth of the seat rail with their free ends.

14. An aircraft or spacecraft, comprising:
a seat adjustment device according to claim 1;
a floor, to which the seat rail of the seat adjustment device is connected; and
a seat, to which the seat connection of the seat adjustment device is connected.

15. The aircraft or spacecraft according to claim 14, wherein the floor comprises crossbars with a respective flange, a base portion of the seat rail being at least partly arranged in an opening in the respective flange and being connected thereto.

16. The aircraft or spacecraft according to claim 14, further comprising:
a passenger terminal device, which is arranged on the seat;
a rail, which extends in a longitudinal direction of the aircraft or spacecraft and is connected to a data processing system and/or an energy supply system; and
an arm, which is connected to the seat and engages in a displaceable manner in the rail in the longitudinal direction of the aircraft or spacecraft, the arm connecting the passenger terminal device to the data processing system and/or to the energy supply system.

* * * * *